United States Patent [19]

Lisk, Jr.

[11] Patent Number: 5,751,834
[45] Date of Patent: May 12, 1998

[54] IMAGE ANALYSIS METHOD FOR DETERMINING PIGMENT LEVELS IN FABRIC

[75] Inventor: James R. Lisk, Jr., Harrisville, Utah

[73] Assignee: BASF Corporation, Mt. Olive, N.J.

[21] Appl. No.: 597,771

[22] Filed: Feb. 7, 1996

[51] Int. Cl.[6] ........................................... G06T 7/00
[52] U.S. Cl. ........................ 382/111; 382/168; 8/400
[58] Field of Search ............................ 382/111, 168, 382/169, 170, 171; 348/88; 427/170, 288; 28/169; 8/400

[56] References Cited

U.S. PATENT DOCUMENTS

| | | | |
|---|---|---|---|
| 3,066,034 | 11/1962 | Temin | 524/399 |
| 3,748,469 | 7/1973 | Molina | 250/459.1 |
| 3,752,590 | 8/1973 | Frappe | 356/405 |
| 3,858,044 | 12/1974 | Frappe | 250/226 |
| 4,562,107 | 12/1985 | Daniels | 428/196 |
| 4,597,670 | 7/1986 | Ohashi et al. | 356/405 |
| 4,807,163 | 2/1989 | Gibbons | 382/171 |
| 4,897,795 | 1/1990 | Yoda et al. | 382/141 |
| 4,974,261 | 11/1990 | Nakahara et al. | 382/141 |
| 5,125,034 | 6/1992 | Hudson et al. | 382/111 |
| 5,335,293 | 8/1994 | Vannelli et al. | 382/110 |
| 5,492,751 | 2/1996 | Butt, Sr. et al. | 428/198 |
| 5,601,871 | 2/1997 | Krzysik et al. | 427/288 |

OTHER PUBLICATIONS

Cardamone et al. "Objective Measurement of Level and Union Shades in Wool and Wool/Cotton Textiles," Textile Chemist and Colorist, vol. 27, No. 10, pp. 13–19, Oct. 1995.
Physical Methods of Investigating Textiles edited by R. Meredith / Textile Book Publishers, Inc. / Copyright 1959 / pp. 378–385.
Textile Analysis by Samuel R. Trorman, M.S., F.R.I.C. / Charles Griffin & Co., Limited / Copyright 1948 / pp. 268–269.

*Primary Examiner*—Joseph Mancuso
*Assistant Examiner*—Jon Chang

[57] ABSTRACT

Image analysis method for determining pigment levels in fabric and yarn material. A sample fabric or yarn is illuminated by a source of visible light and a selected field area of the material is recorded then digitalized and stored in a video memory device. The digitalized field area is resolved into discrete segments or pixels having different intensity or gray level values. A frequency distribution in the form of a histogram of gray level values is plotted, and the resulting histogram is interpreted to determine pigment levels in the material sample.

34 Claims, 2 Drawing Sheets

IMAGE ANALYSIS METHOD FOR DETERMINING PIGMENT LEVELS IN FABRIC

BACKGROUND OF THE INVENTION

The present invention is directed to the field of image analysis. More specifically, the present invention is directed to quantifying pigment levels in fabric and yarn material by image analysis.

For many purposes, it is desirable to identify a fabric as to its origin of manufacture, method of preparation, or determine content of dyes or pigments in the fabric. Frequently, manufacturers of textile goods wish to distinguish their articles from those of other manufacturers. Also, manufacturers of such articles desire a uniformity of shade or tone in the color of the final product. Fabrics and filamentary articles such as, fibers, filaments, yarns, cords, tows, nonwovens, and the like for carpets and garments are examples of such articles. The most readily accomplished means for distinguishing such articles is by the addition of a substance that imparts an identifiable characteristic to the article such as a color or a shade of color, a characteristic flame or chemical test, and the like. An important requisite of a suitable substance is that it is readily identifiable by some simple test. Other considerations, however, also are important such as its ease of application and permanence of its retention on the article. Also, appearance of many products is critical to their usefulness, thus the substance added should not alter the desired appearance or processability of the article.

In certain industrial applications, it is common to identify yarns by coloring the yarns. Such methods of identification are limited to applications in which the appearance is not significant in its use or apparent to a consumer such as when it is used as a reinforcing material in rubber and the like. Use of such a means of identification also is handicapped in that colors are very difficult to standardize from one dye lot to another. It is possible that more than one manufacturer may use comparable colors which would result in confusion not only with the same manufacturer's products but also with other manufacturers' products.

Color standardization is far more important where fabric color or yarn color is desired for aesthetic purposes rather than industrial purposes. Such color standardization is very important in articles such as carpets, rugs, clothing and the like. A common means for standardizing color or modifying intensity of color in a fabric or yarn used for aesthetic purposes is to add a delusterant or opacifier to the material. Thus, a fabric's tone or shade can be readily controlled by a manufacturer. Commonly employed delusterants are metal sulfates, metal carbonates, or metal oxides such as titanium dioxide. A problem associated with delusterants and opacifiers during their addition to fabric or yarn is non-uniform distribution or improper levels of delusterant or opacifiers throughout the material. This results in an undesirable texture, i.e., visual or tactile surface characteristics and appearance of an article, such as shade or tone variation in the material, thus manufacturers test each lot of material for delusterant levels to assure a uniform and desirable texture or color quality.

Dyed fabrics and yarns show texture contrast due to variation in delusterant levels more readily than undyed material. Where there is no texture contrast between dyed material and delusterant visible to the naked eye. Hence undesirable streaks or undesirable tones can appear to the naked eye in fabric after dying that were invisible before dying. The amount of light reflection from the fabric is a function of light path length and dye properties. When delusterant is present, the average path length of reflected light is less than when delusterant is absent. Thus, regions of the fabric or yarn where delusterant concentrations are high are less intense in color than regions of the material having low concentrations of delusterant. Hence texture contrast due to variation in delusterant is seen most readily in dyed materials than in undyed materials. Consequently, manufacturers of fabrics and yarns would like to be sure that undyed material has the desired concentration of delusterant prior to dying material to avoid undesired tone or shade of a fabric or yarn lot.

Current methods for analyzing pigment levels in fabric and yarn where there is no visable contrast between pigment and material are not only hazardous to workers and the environment, but also result in destruction of material. One method of analyzing pigment levels in yarn is by X-ray fluorescence. A yarn sample is bombarded with X-rays and kinetic energies of photoelectrons from pigment in the yarn are measured by an electron analyzer to determine pigment concentration. A second method for measuring pigment level in yarn is by titration. Where the pigment is titanium dioxide, a sample of yarn is dissolved in a suitable solvent followed by titrating with a solution of ferric alum with potassium sulphocyanide as an indicator.

Disadvantages of both methods not only include destruction of yarn during analysis, but also potential exposure of workers and of the environment to radioactive and toxic chemical waste. Consequently, the yarn industry would prefer a method of measuring pigment levels in yarn which is non-destructive to yarn and safer for workers and the environment.

In certain industries texture analysis technology is used to characterize surface textures which are visible to the naked eye. Such optical surface inspection methods are employed, such as digital image processing, for rapid inspection of a surface defect of an article such as a crack, stain, dent, pinhole or protrusion. Advantageously, such methods permit rapid inspection of the texture of an article without damage or destruction to the article. A selected field of the article is photographed and then the photographic image is classified into pixels (picture elements). Pixel classification sometimes is referred to as segmentation, in which various segments of an image are identified as belonging to individual product component types. Pixel classification commonly is used in quality control or product industry, in order to distinguish between acceptable and defective products.

Before automated product inspection can take place, an image of the product is captured in a form which is meaningful to a computer or data processor; a form in which the image is represented by a series or array of numbers. Electronic video systems do this by dividing an image into a number of discrete picture elements or pixels. Each pixel has an associated color value, representing the hue and intensity of that portion of the image which corresponds to the pixel.

In a monochrome or black-and-white video system, color value is specified by a single variable which ranges from 0 to n. The color value in such a case represents the absolute light intensity or luminance of the image area corresponding to the pixel. A color value of 0 corresponds to black, and a color value of n corresponds to an integer representing a varying shade of gray.

In segmenting a video image, it is necessary to classify each possible color value as one of a plurality of component types. A component type is defined as an area of the product representing a single quality classification such as "acceptable" product, "white defect" product, "brown defect" product, or another classification, depending on the nature of the product. In practice, it is desirable to define a number of such quality classifications corresponding not only to visually identifiable product areas, but also to areas representing foreign objects such as rocks or wood. Segmenting the video image is often the first and most critical step in a detailed image analysis which can include many subsequent analytical steps. Such a method is disclosed in U.S. Pat. No. 4,974,261, issued to Nakahara et al., for detecting surface defects on circuit boards.

Briefly, in the method of Nakahara et al. an article surface to be inspected is processed to provide an original gray level value image and an edge picture image. The original gray level value image is a two-dimensional image composed of a number of pixels (picture elements) having individual gray level values representing the degree of luminance (brightness) or intensity of the article surface. The edge picture image is a binary image representing a border line of the article surface and an edge which may be indicative of a defect such as a crack, stain, indentation or like surface irregularities. The edge picture image is scanned for detecting the edge within the boarder line of the article surface. When the edge is detected in the scanning operation, a flag point is designated at the pixel where a scan line transverses with the edge. A plurality of the pixels in the vicinity of the flag point are selected which are arranged in the direction substantially perpendicular to the edge direction on the respective sides of the flag point. The selected pixels are evaluated, in terms of their gray level values of the corresponding pixels in the original gray value image, whether there is a critical change between the pixels on the opposite sides of the flag point. In this manner, a plurality of the pixels around the flag point can be considered to enhance the contrast between the regions on the opposite sides of the edge, disclosing a defect in the article. Thus, Nakahara et al. suggests a possible method to detect a vague defect which only shows a poor texture contrast in relation to the adjacent normal region and is difficult to be detected by other inspection means.

Although image analysis methods have been used to determine defects in such articles as circuit boards and the like which show some degree of textural contrast, no method has been developed for analyzing pigment levels in fabrics or yarns where there is no texture contrast observable to the naked eye. Thus, there is still a need for a method of analyzing pigment levels in fabrics and yarns.

A primary objective of the present invention is to provide a non-destructive method of image analyzing pigment levels in a fabric or yarn where pigment variation level can not be detected by the naked-eye.

Another object of the present invention is to provide a method for rapid analysis of pigment levels in a fabric or a yarn, and to directly monitor pigment levels in such materials.

Still yet another object of the present invention is to provide a method having the flexibility and convenience to readily obtain computer programs to digitalize an image and calculate the parameters to determine pigment levels in fabrics and yarns.

A further object of the present invention is to provide for a worker and environmentally friendly method of analyzing pigment levels in fabrics and yarns.

Additional objects and advantages of the present invention will be set forth in part in the description which follows, and in part will become apparent to those skilled in the art upon examination of the application, and by practice of the present invention.

SUMMARY OF THE INVENTION

The present invention is directed to an inspection method for determining pigment levels in fabric or yarn by image analysis where there is no texture contrast between the pigment and the material that is visible to the naked eye. A fabric or yarn sample is illuminated by a light source and a selected field of the illuminated fabric is recorded or imaged to create a record having a plurality of discrete segments of varying values. The discrete segments are pixels or picture elements having varying luminance, or gray levels, which are digitally resolved into one of a multiple of discrete values, or gray level values. Each gray level value corresponds to an integer. The range of gray level values varies depending upon the resolution of the digital converter. The occurrence of each gray level value is recorded for the selected field image. A frequency distribution of the occurrence or frequency of each gray level value verses gray level values of a cross section of the recorded field image is prepared.

The frequency distribution then is interpreted to determine pigment level in the fabric or yarn sample. The frequency distribution is interpreted by determining the coefficient of variation of the frequency distribution, and employing the coefficient of variation in a multinomial equation.

Advantageously, The method of the present invention can be employed to determine pigment levels in both fabric and yarn. In particular, the method of the present invention is effective especially for determining levels of delusterants and opacifiers such as titanium dioxide and the like in fabric and yarn where there is no texture contrast between the delusterant and material that is visible to the naked eye. The method of the present invention also is nondestructive to such material samples, and is worker and environmentally friendly since there are no chemical or radioactive wastes involved. Further, the method of the present invention provides for a direct and rapid analysis of pigment levels in fabric and yarn. Additionally, the method of the present invention can employ readily obtainable computer hardware and software for digitally resolving a recorded image of a fabric sample, and calculating the necessary parameters to determine pigment levels in fabric and yarn.

DETAILED DESCRIPTION OF THE INVENTION

Figure 1:
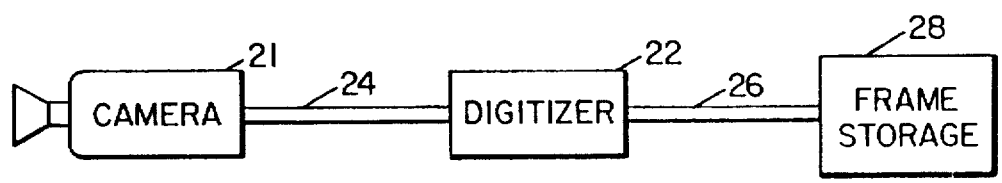
FIG. 1 is a schematic representation of one embodiment of the present invention for creating a digital record of a selected field of an article.

Image analysis methods of the present invention are directed to non-destructive methods of determining pigment levels in fabric or yarn where there is no texture contrast that is visible to the naked eye between the pigment and the fabric or yarn. In accordance with the present invention, a sample of pigment containing fabric or yarn is illuminated by a source of light such as visible light from one or more flood-lamps, preferably, a tungsten and fiber optic ring light lamp (commonly used in microscopy), or any suitable source of visible light.

One or more light sources can be employed to illuminate the material sample. Preferably, each light source is arranged to illuminate the sample such that any light contrast or shadows on the sample is minimized, while not being overly diffuse. Most preferably, for best results, the source of illumination is arranged such that there is no light contrast on the sample material being analyzed.

A field area or flat surface section of a fabric or yarn is selected randomly for recording an image. An image of the material is recorded for analysis of pigment level. Preferably, multiple images, from two to six images or more, are taken of the selected area and averaged to reduce noise or blurring of the recorded image, thus providing a more accurate image of the selected field area for pigment analysis. Any suitable recording device which can record images such as a black and white video camera can be employed to record the images of the fabric being analyzed. The selected field area need not be recorded in black and white to allow the successful practice of the present invention. Color field representations also can be recorded, digitized and resolved into identifiable, multiples of discrete values or discrete gray levels for analysis.

The video images of the selected field area that are recorded are converted from an analog raster scan image of the recording device, and averaged to a two-dimensional digital image by an analog-to-digital converter or digitizer. The digital image is made up of pixels (pixel=picture element). The number of pixels which make up the digital image can vary depending on the resolution of the analog-to-digital converter employed. The greater the resolution, the greater the number of pixels which make up the digital image, and the more precise the image of the field area recorded. Any suitable analog-to-digital converter employed in surface inspection methods can be used to practice the present invention. A preferred converter is one having a digital image composed of 512 pixels in each dimension for a total of $512^2$ pixels. Additionally, luminance (brightness) information associated with video scan lines also is converted to a digital value corresponding to a gray level by an analog-to-digital converter. Ranges for gray level values vary depending on the number of resolution bits in the analog-to-digital converter employed. A commonly employed analog-to-digital converter for optical resolution process is an 8-bit ($2^8$=256) resolution analog-to-digital converter. Each pixel is assigned a gray level value depending upon its luminance signal at its location in the analog video image. In an 8-bit analog-to-digital converter, a gray level value of 0 corresponds to the darkest part of the video image, while a gray level value of 255 corresponds to the lightest part of the video image.

Camera distance from the sample material to be photographed, preferably, is such that a reasonably large frequency distribution of gray level values is recorded. For example, a suitable gray level distributin can range from 256 gray level values or more. Suitable camera distance can vary depending on the camera and lens employed. A camera having an 18 mm to 108 mm lens preferably is placed at about 25 cm to 35 cm. from the sample material, most preferably from 27 cm to 30 cm. Camera lens opening and offset and gain are adjusted to preferably place the average pixel value near the middle of the gray scale range of a sample material to allow sufficient variation in gray scale values to calculate an accurate standard deviation. Any suitable lens opening which permits calculation of an accurate standard deviation can be used, preferably, an f-stop of 1.25 to 2.5 is employed.

Gray level values then are registered or stored in a video memory as a frequency distribution of occurrences of each gray level value recorded. Any suitable video memory storage device employed in surface inspection methods, such as an 8×256k memory device, can be employed to practice the present invention. The frequency of each gray level value of a cross section of the two dimensional video image can be plotted against gray levels from 0 to n values to form a frequency histogram of the frequency distribution, where 0 is the darkest gray level (black), and n is an integer representing a varying shade of gray. A vertical, horizontal or diagonal cross section only of the digitalized video image is plotted in a frequency histogram for analysis. The choice of which cross section of the video image to plot is random, and a choice of one cross section over another does not affect the statistical or final concentration determination of pigment level in the fabric or yarn material tested. Any suitable imaging analysis program can be used to practice the present invention such as, for example, NuVision® by Perceptics Corp. (Westinghouse subsidiary) of Knoxville, Tenn. It is the mathematical interpretation of the frequency distribution of the gray level values which allows determination of amount of pigment in the fabric.

The coefficient of variation of the frequency distribution is determined followed by employing this value in a multinomial equation to solve for the concentration level of the pigment in the fabric or yarn analyzed.

The percent coefficient of variation of the frequency distribution or histogram can be determined by the following equation.

$$\% \ C.V = 100 s/X \tag{1}$$

where C.V. is the coefficient of variation of the frequency distribution of the fabric or yarn sample being tested, s is the standard deviation of the frequency distribution of the material tested and X is the mean of the gray level values of the cross section as determined from the frequency distribution.

The standard deviation, s, of the frequency distribution is determined by the square root of the following equation.

$$S^2 = \frac{1}{N} \sum_{i=1}^{N} (x_i - X)^2 \tag{2}$$

where $s^2$ is the variance of the frequency distribution or histogram, $x_i$ represents a gray level value of the ith pixel in a cross section of N (number) pixels, and X is the mean of the gray level values of the cross section.

The standard deviation of the frequency distribution changes with the pigment levels in fabric and yarn material. The greater the pigment levels in a material sample the larger the standard deviation of the frequency distribution or histogram. Measuring large amounts of material often results in a larger standard deviation than analysis of relatively small amounts of material.

The value obtained for the percent coefficient of variation can be incorporated into a multinomial equation such as the following binomial equation to determine the concentration of pigment in the tested material sample.

$$c = mC.V. + b \quad (3)$$

where c is the percent concentration of pigment in the material tested, m is the slope of the binomial equation and b is the intercept of the binomial equation when the equation is plotted on a Cartesian plane, and C.V. is the percent coefficient of variation. Thus, there can be a linear relationship between the percent coefficient of variation of the frequency distribution or histogram and pigment levels in fabric or yarn.

Values for slope m and intercept b are constant for a given material being tested and can be determined by any suitable subroutine method or applications program spreadsheet which has a linear regression program such as Lotus 1,2,3®, Microsoft Excel®, Busy Calc.® and the like. Specific steps of one method to calculate m and b using the coefficient of variation of the frequency distribution by means of linear regression can be found in "Statistics: An Introduction" by Albert D. Rickmers and Hollis N. Todd, McGraw Hill, 1967, pages 239–262. Any suitable method of linear regression can be employed to determine constants m and b. Additionally, it is preferable to calculate percent coefficient of variation inside image processing software as a custom routine.

Calculation of pigment level concentrations in fabric and yarn is not limited to binomial equation 3 above. More complex polynomial equations such as % c=% $C.V.x^2 + dx + e$ and the like, also can be employed for wide ranging percent coefficient of variation values or where large differences in pigment levels are anticipated to provide a more accurate pigment level concentration analysis of a sample. Constants of such polynomial equations such as d and e can be calculated by the same methods as the constants m and b for the binomial equation described above.

Statistical analysis and calculation of pigment level in a fabric or yarn can be performed manually using the foregoing equations or such computations can be carried out with any suitable computer program and computer hardware and software. Examples of a suitable computing device are an IBM AT personal computer and a Microsoft Fortran 3.2 compiler.

The concentration value determined for the tested material is compared to a standard control sample. If the concentration of the tested material falls outside the range of the standard control sample, the material is rejected and prevented from being incorporated into a final product such as carpeting, coverstock, clothing and the like. The standard control sample will vary depending upon the manufacturer's preference and industry standards as well as the type of article for which the material will be used. To achieve the most reliable image analysis data, the camera and lighting from sample to sample to control, preferably, remains the same.

The method of the present invention can be used to determine pigment levels in nonwoven fabrics such as fabrics composed of both monocomponent staple fibers and bicomponent staple fibers as well as yarns composed of various types of fibers such as nylon and the like. Also, the method of the present invention can be employed to measure pigment levels in woven fabrics composed of fibers of cellulose and the like. Typically, delusterant pigments employed in such materials include, but are not limited to, metal oxides such as titanium dioxide, and magnesium oxide; sulfates such as calcium sulfate, and barium sulfate; and magnesium carbonate and the like. Generally, pigments range in quantities of from about 0.1 wt. % to about 1.0 wt. % of a material.

In an illustrated embodiment of the present invention, recording device 21 of FIG. 1 is a video camera from which the analog output is directly connected to the analog-to-digital converter or digitizer 22. The digitized display of FIG. 2 comprises a single frame, which is a typical video display, is transmitted about every one-thirtieth (1/30) of a second. The digitizer 22 divides the video frame into a digital representation having, for example, 512 vertical and 512 horizontal screen locations, or pixels. Each of these pixels is described by a discrete gray level, which is digitally identified as an 8-bit binary word. Use of an 8-bit binary word provides two-hundred fifty-six (256) possible shades of gray for each of approximately 262,000 pixels. These values then can be stored in any suitable memory device such as an 8×256K memory device, such as frame storage 28.

Figure 2:
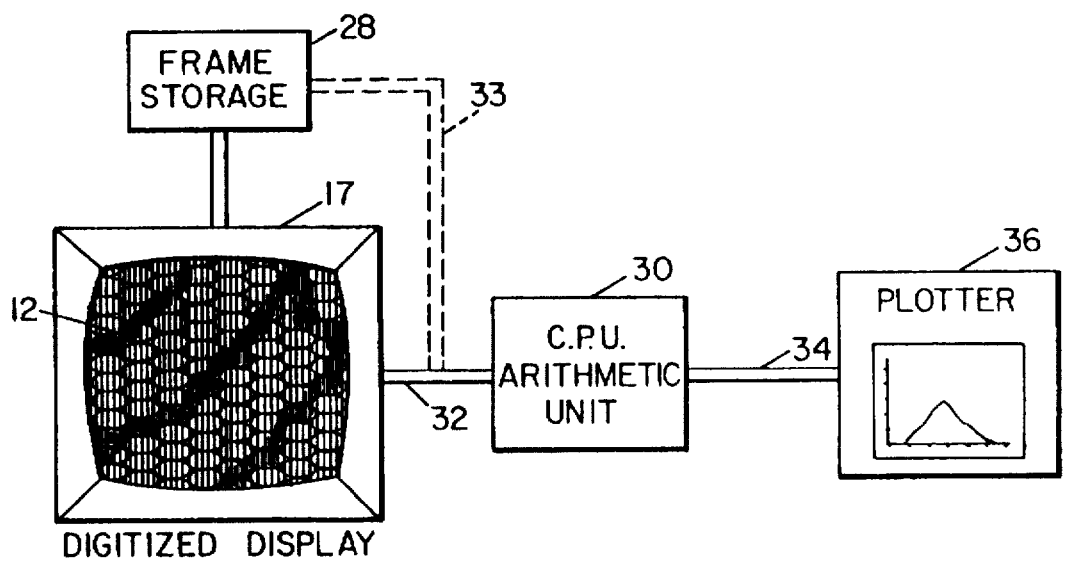
FIG. 2 is a schematic representation of a digitized display of a yarn to be analyzed and processing means to practice the present invention.

The video image stored by the frame storage means 28 then can be redisplayed on a video display monitor 17 such as illustrated in FIG. 2 as a digitized display. FIG. 2 also illustrates a CPU arithmetic unit 30 which is used to further process the digital information stored in the frame storage 28. A suitable bus 32 connects the CPU unit 30 and the video monitor 17. Also, as illustrated by dashed line 33, the CPU arithmetic unit 30 can be directly connected to the frame storage unit 28, as the digitized video information need not be displayed on the video monitor to practice the present invention. The CPU arithmetic unit 30 is further connected by a bus 34 to a suitable plotter device 36 to provide a plot of the output of the CPU arithmetic unit 30.

In accordance with the present invention, the digital video information stored in the frame storage means 28 is representative of the visual field illustrated by the material test sample field area 12 as shown in FIG. 2. As mentioned above, in the frame storage 28 the fabric test sample field area 12 comprises approximately 262,000 separate gray level values in a digital format. The CPU arithmetic unit 30 processes this digital information to register the frequency of occurrence of each discrete gray level value in the total 262,000 pixels stored in the frame storage 28. The CPU unit 30 then provides information to plotter 36 to generate an illustrative plot of a frequency histogram of frequency of gray level values verses gray level values. It is envisioned that the CPU unit 30 may comprise any suitable digital processing means. For example, an IBM AT personal computer or other similar personal computer can be readily utilized.

Figure 3:
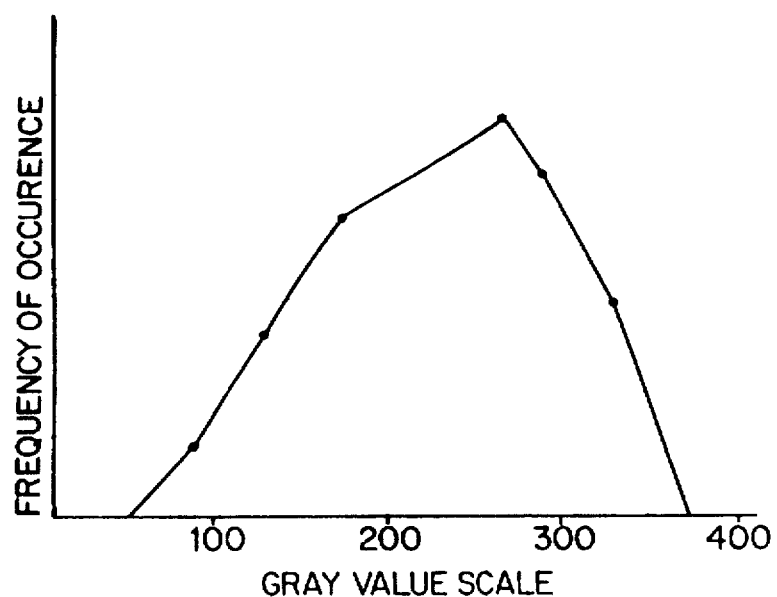
FIG. 3 is an illustration of a frequency histogram generated in accordance with the present invention and illustrating discrete intensity levels of the digitized display.

An illustrative plot produced by the plotter 36 from processing of gray level values of the visible field pixels by CPU unit 30 is illustrated in FIG. 3. The plot of FIG. 3 can be referred to as a frequency histogram or a frequency distribution and provides a ready indication of the occurrence or frequency of each discrete gray level value in the total number of pixels comprising the visible field to be studied. As illustrated in FIG. 3, gray level values are represented along a horizontal scale and frequency of occurrence of any particular gray level value along the vertical axis. Thus, in accordance with the practice of the means and method of the present invention, a visual field, such as defined by the material test sample field area 12, can be recorded, digitized and displayed as a frequency histogram of discrete gray levels.

For digitally recording an analog visual signal such as illustrated in FIG. 2, any suitable method and apparatus can be employed. For example, MSDOS-based C compilers and various algorithms and image analysis for computer graphics set forth in Pavlides T., *Algorithms for Graphics and Image Processing*, Computer Science Press, Rockville, 1982, can be utilized to create the digitally stored frame image of the visual analog image of FIG. 2. Additionally, any suitable real time video digitizer module for use with personal computers can be utilized, such as is available from Imaging Technology Incorporated, 600 West Cummings Park, Walburn, Mass. 01801. Accordingly, the video monitor 17 illustrated in FIG. 2 can be replaced with a personal computer display for providing a video output display of the digitized information contained in frame storage 28.

Figure 4:
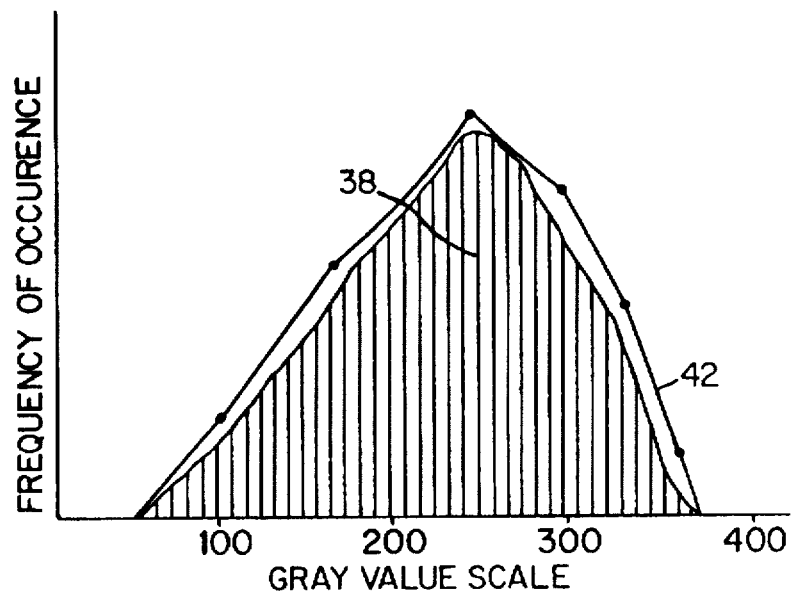
FIG. 4 is a graphic representation of a single Gaussian function superimposed over the frequency histogram of FIG. 3 illustrating the discrete segments thereof.

In accordance with the practice of the present invention, the histogram of FIG. 3 can be resolved into a single component Gaussian distribution such as is illustrated in FIG. 4. A single Gaussian distribution can be represented by the following formula:

$$f(x) = \frac{1}{s(2\pi)^{1/2}} e^{(x^i - u)^2/2s^2} \tag{4}$$

where, u is the mean of the distribution, and s is the standard deviation, and $x_i$ is the observed gray scale value for screen location (pixel)i.

Referring again to FIG. 4, the distribution 38 has a mean gray-scale value of approximately 250. The single component Gaussian distribution approximately matches or fits the identified peak in the frequency histogram illustrated by trace 42 in FIG. 4 and shown clearly in FIG. 3. The Gaussian component distribution 38 can be generally given by equation (4) above with the appropriate values substituted.

The standard deviation, coefficient of variation and concentration of pigment level in a fabric can be determined manually from the information disclosed in the histogram or calculated by computer as disclosed above.

Figure 5:
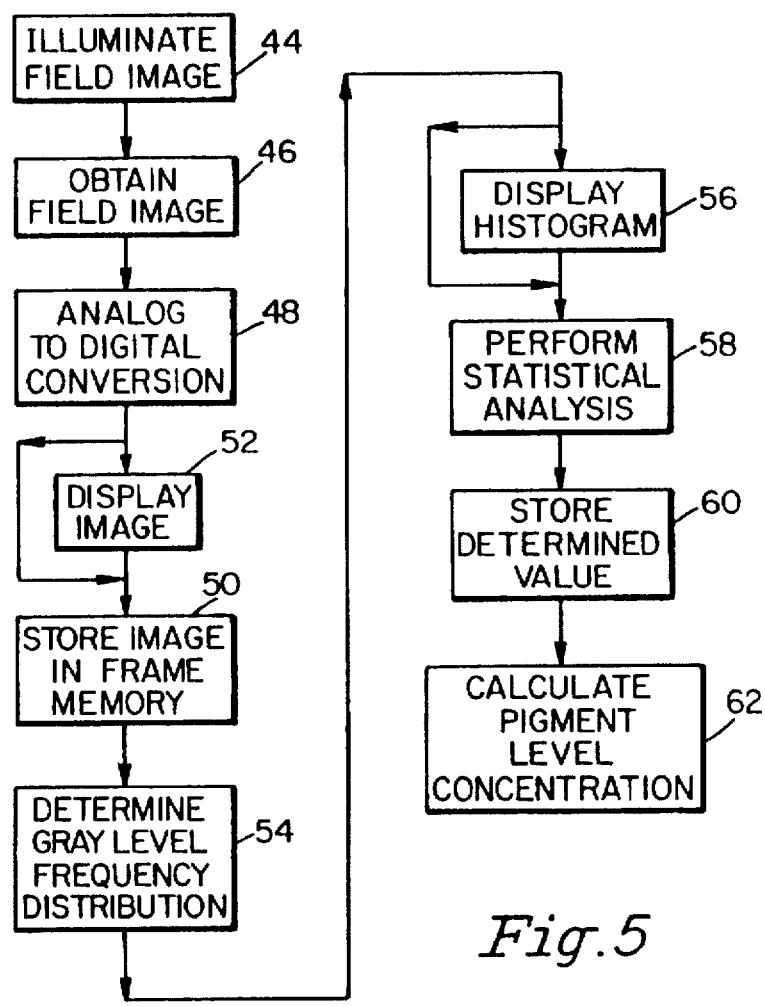
FIG. 5 is a schematic representation of one embodiment of the present invention for determining delusterant level in a yarn.

Referring to FIG. 5, therein is shown a general flowchart which outlines the procedures for the operation of the means and method of the present invention for obtaining the pigment level in a fabric or yarn. As illustrated by block 44 the method is initiated by positioning and illuminating a selected field of a fabric to be analyzed. A record of the field image then is obtained, as shown by block 46, by any suitable means such as video camera 21 or another photographic/video device. The obtained field image then is digitized as represented by block 48 through the use of an analog-to-digital converter or any other suitable digitizing equipment such as that shown by digitizer 22 in FIG. 1. Digitized information representative of the selected field area image then is stored as shown by block 50 in a frame storage 28 such as is shown in FIGS. 1 and 2. The digitized information can be displayed prior to storage as shown by block 52. Block 54 represents arithmetic analysis of the digitized information stored in the memory to determine the gray level frequency distribution. This can be done, for example, by the CPU arithmetic unit 30 illustrated in FIG. 2. The resulting frequency distribution of the stored gray levels then can be displayed as a histogram as shown by block 56 which corresponds to plotter 36 of FIG. 2 to obtain a plot such as is shown in FIG. 3.

Once the frequency distribution of the stored pixel gray levels has been determined, a statistical analysis as illustrated by block 58 is performed to provide a measure of the variance, standard deviation and coefficient of variation of the histogram. The statistical analysis can be done manually or by computer as disclosed above. The result is the stored determined values as illustrated by block 60. The values can be stored by any suitable means such as in the RAM (random access memory) or the long term memory of any suitable computer such as a personal computer. The coefficient of variation then is employed in equation (3) to calculate the pigment level in the fabric sample as illustrated in block 66. Constant values, m and b, for equation (3) above are determined by a suitable applications program spreadsheet such as Lotus 1,2,3®.

The following example is not intended to limit the scope of the present invention but is included to more clearly describe the present invention.

EXAMPLE I

Two undyed nylon yarn control samples are prepared from bicomponent staple fibers having a sheath/core arrangement composed of polyethylene/polyethylene terephthalate having a 60:40 weight ratio.

Control I contains 0.5% of titanium dioxide by weight of the yarn, and control II contains 0.2% by weight of the yarn. The concentration of each control is determined by assaying a 5 inch by 5 inch sample of each yarn by titration with alum and sulphocyanide as the indicator.

Test samples A, B, and C are undyed yarns of the same composition and lot as Control I.

Test samples D, E and F are yarns of the same composition and lot as Control II.

Each test sample is tested for titanium dioxide levels and compared to their respective controls to show that the method of the present invention can accurately and rapidly measure pigment levels in yarn.

A surface area of each yarn sample is illuminated by four 150 watt floodlamps. Four photographs are taken of an area of 10 inches by 10 inches of the surface of each test sample by a conventional black and white video camera connected to an IBM analog-to-digital converter by a bus. The analog-to-digital converter, or digitizer, converts the individual images composed of pixels or picture elements to gray levels and averages the gray levels of each image and assigns gray level values to each gray level based on each gray level's luminance. Since the digitizer has an 8-bit resolution, each pixel is assigned an integer from 0 to 255 where 0 corresponds to black and 255 corresponds to white. The integers in between are varying shades of gray.

The gray level values are stored in a 8×256K memory device. The information from the memory device is transferred to a CPU arithmetic unit by a bus connecting both functional units. The CPU arithmetic unit tallies the occurrences of each gray level value into a frequency distribution.

The standard deviation and coefficient of variation of the frequency distribution are determined manually using the following equations respectively:

$$S^2 = \frac{1}{N} \sum_{i=1}^{N} (x_i - X)^2 \quad C.V. = \frac{100s}{X}$$

The values m and b which are constants in the equation c=mC.V.+b are determined using Lotus 1, 2, 3® linear regression program with the numerical values for the coefficients of variation. Mathematical steps for calculating constants m and b are listed in the text "Statistics: An Introduction" by Rickmers et al. Table I below discloses the results of the test samples assayed.

TABLE I

| Test Sample | C.V. | m | b | c |
|---|---|---|---|---|
| A | 0.0080 | 50 | 0.1 | 0.50% |
| B | 0.0082 | 50 | 0.1 | 0.51% |
| C | 0.0080 | 50 | 0.1 | 0.50% |
| D | 0.0020 | 50 | 0.1 | 0.20% |
| E | 0.0022 | 50 | 0.1 | 0.21% |
| F | 0.0020 | 50 | 0.1 | 0.20% |

Thus, each test sample shows a pigment level identical to or very close to their respective controls as expected using the method of the present invention. Consequently, the method of the present invention is an accurate method of determining pigment levels in yarn, and the equation c=mC.V.+b shows a linear relationship between pigment concentration in yarn and the coefficient of variation where the concentration of pigment levels in yarn can be easily and reliably determined.

What is claimed:

1. A method for determining pigment concentration levels in fabric or yarn material comprising:

a. illuminating the material with a light source;

b. recording an image of a selected field area of a surface of the material to create a record having a plurality of discrete segments of varying values;

c. digitally resolving an intensity of each discrete segment into one of a multiple of discrete values;

d. processing frequency of occurrences of the multiples of discrete values of a cross section of the selected field area to obtain a frequency distribution of each discrete value;

e. resolving a coefficient of variation of the frequency distribution; and f. employing the coefficient of variation as one variable of a multinomial equation.

2. The method of claim 1, wherein the multinomial equation is a polynomial.

3. The method of claim 1, wherein the material is illuminated by a source of visible light.

4. The method of claim 3, wherein the visible light source does not create a contrast on the material.

5. The method of claim 1, wherein the surface of the selected field area of the material is recorded in the form of an analog raster scan image.

6. The method of claim 1, wherein the plurality of discrete segments are pixels.

7. The method of claim 2, wherein the multiples of discrete values are gray level values.

8. The method of claim 7, wherein the gray level values range from 0 to n.

9. The method of claim 8, wherein n is an integer from 1 to 255.

10. The method of claim 1, wherein the frequency distribution is a frequency histogram.

11. The method of claim 1, wherein the coefficient of variation is determined by the following equation:

$$C.V.=100s/X$$

where C.V. is the coefficient of variation, s is the standard deviation of the frequency distribution, and X is the mean of a multiple of discrete values.

12. The method of claim 11, wherein the standard deviation of the frequency distribution is determined by the square root of the following equation:

$$S^2 = \frac{1}{N} \sum_{i=1}^{N} (x_i - X)^2$$

where $s^2$ is the variance, $x_i$ represents the gray level value of the $i_{th}$ pixel in the cross section of N pixels and X is the mean of the gray level values.

13. The method of claim 1, wherein the multinomial equation is c=mC.V.+b, where c is pigment concentration, m is the slope of the equation, b is the intercept of the equation, and C.V. is the coefficient of variation.

14. The method of claim 1, wherein the record of the selected field area of the material is visually displayed.

15. The method of claim 1, wherein the frequency distribution is visually displayed.

16. The method of claim 1, wherein the frequency distribution is tangibly recorded.

17. The method of claim 1, wherein the pigment comprises metal oxide pigments.

18. The method of claim 17, wherein the metal oxide pigments are selected from the group consisting of titanium dioxide and magnesium oxide.

19. The method of claim 1, wherein the pigment consists of delusterants selected from the group consisting of Barium sulfate, calcium sulfate and magnesium carbonate.

20. The method of claim 1, wherein the material comprises from about 0.1 wt. % to about 1.0 wt. % of pigment.

21. The method of claim 1, where the selected field area of the material is recorded by a video camera.

22. The method of claim 21, wherein the camera comprises a lens with a ring light.

23. The method of claim 21, wherein the lens is an 18 mm to 180 mm lens.

24. The method of claim 21, wherein the camera is from about 25 cm to about 35 cm distance from the material.

25. A method for determining pigment levels in fabric and yarn material comprising:

a. Illuminating the material with a source of visible light;

b. recording an image of a selected field area of a surface of the material with a video camera in the form of an analog raster scan image;

c. converting the analog raster scan image to a digital image composed of pixels;

d. converting luminance of the pixels to a digital value corresponding to gray levels;

e. processing a frequency of occurrences of gray levels of a cross section of the selected field area to obtain a frequency distribution of each gray level;

f. resolving the coefficient of variation of the frequency distribution; and h. resolving the pigment level in the material with binomial equation c=mC.V.+b, where c is the level of pigment in the material, m is the slope of the linear equation, b is the intercept of the frequency distribution, and C.V. is the coefficient of variation.

26. The method of claim 25, wherein the coefficient of variation is defined by the following equation:

$$\%C.V.=100s/X$$

where s is the standard deviation of the frequency distribution and X is the mean of the gray level values.

27. The method of claim 26, wherein the standard deviation is determined by the square root of the following equation:

$$S^2 = \frac{1}{N} \sum_{i=1}^{N} (x_i - X)^2$$

where $s^2$ is the variance, $x_i$ is the gray level value of a pixel in the cross section of N pixels, and X is the mean of the gray level values.

28. The method of claim 25, wherein the pigment is a metal oxide selected from the group consisting of titanium dioxide and magnesium oxide.

29. The method of claim 25, wherein the pigment is a delusterant selected from the group consisting of Barium sulfate, calcium sulfate, and magnesium carbonate.

30. The method of claim 25, wherein the selected field of the material is visually displayed.

31. The method of claim 25, wherein the frequency distribution is a frequency histogram.

32. The method of claim 31, wherein the frequency histogram is tangibly recorded.

33. The method of claim 25, wherein the material comprises from about 0.1 wt. % to about 1.0 wt. % of pigment.

34. The method of claim 25, wherein the material is selected from the group consisting of nylon yarn, woven fabric, and nonwoven fabric.

* * * * *